Feb. 4, 1930.    R. W. BISSELL    1,745,524
METHOD OF AND APPARATUS FOR MACHINING VALVES, ETC
Filed June 19, 1925    3 Sheets-Sheet 1
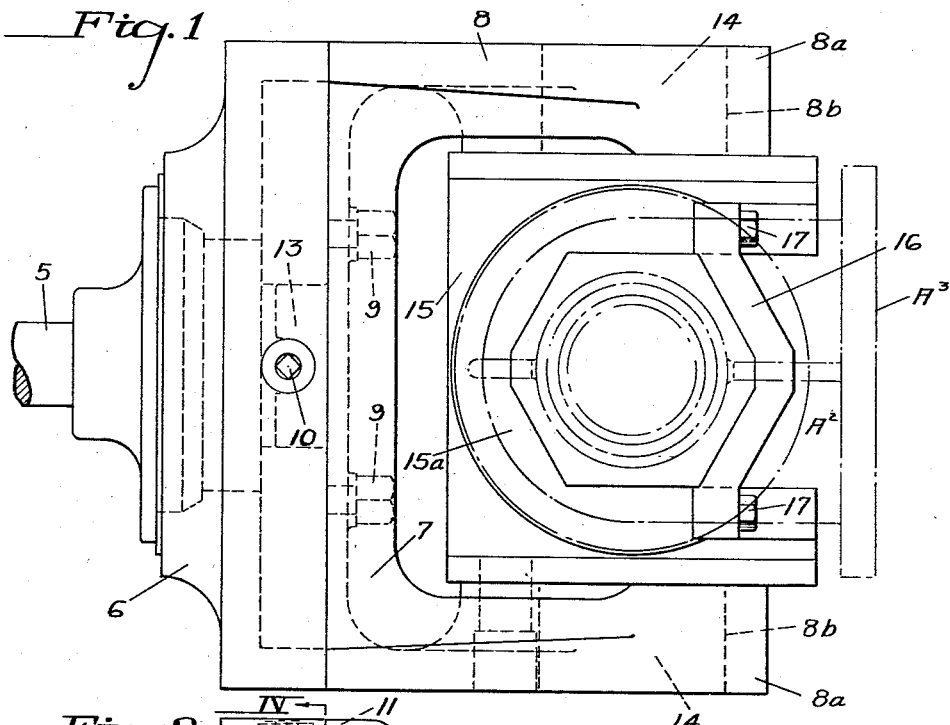
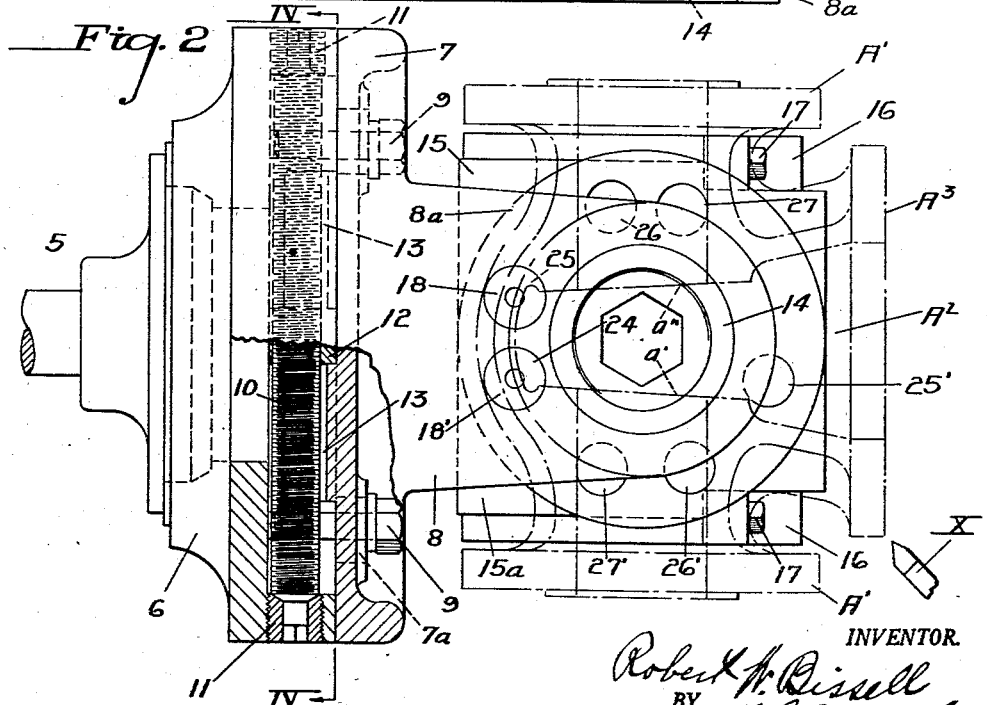
INVENTOR.
Robert W. Bissell
BY
W. G. Doolittle
ATTORNEY.

Feb. 4, 1930.  R. W. BISSELL  1,745,524
METHOD OF AND APPARATUS FOR MACHINING VALVES, ETC
Filed June 19, 1925   3 Sheets-Sheet 2
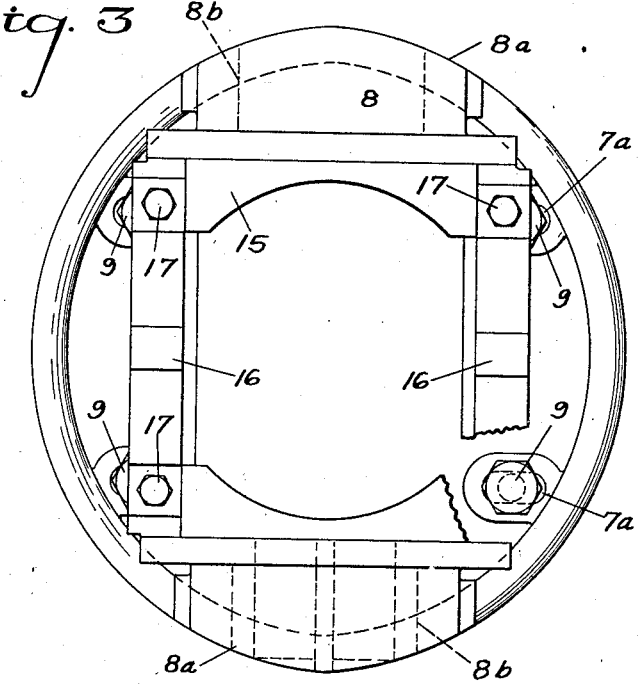
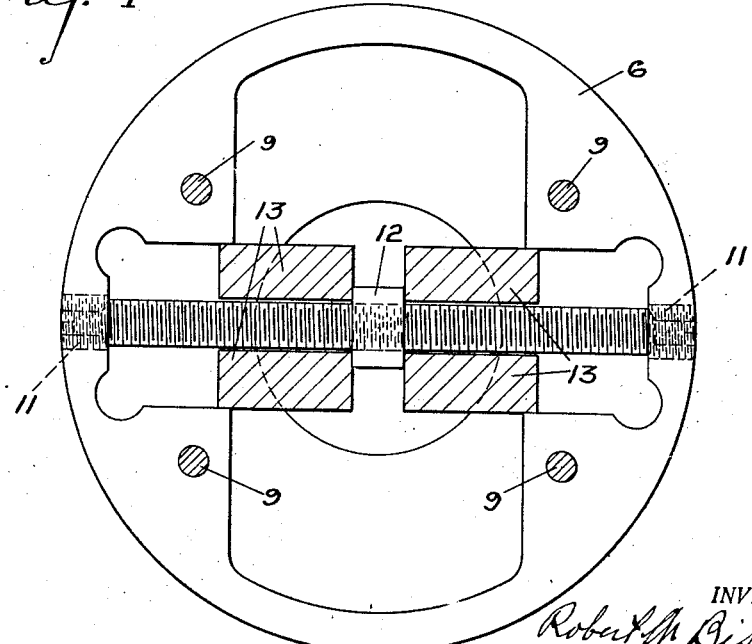
INVENTOR.
Robert M. Bissell
BY
ATTORNEY.

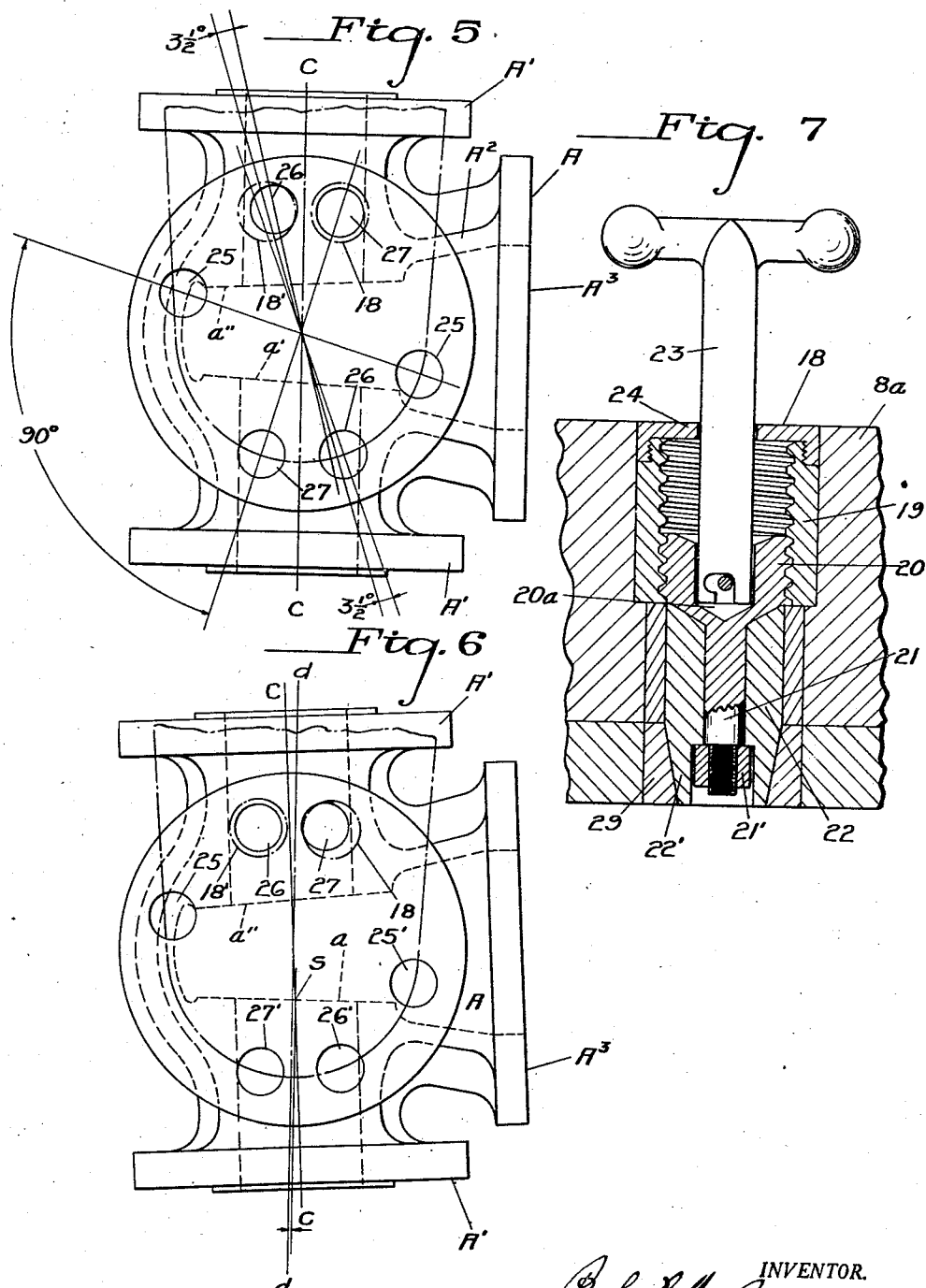

Patented Feb. 4, 1930

1,745,524

UNITED STATES PATENT OFFICE

ROBERT W. BISSELL, OF PITTSBURGH, PENNSYLVANIA, ASSIGNOR TO KEROTEST MANUFACTURING COMPANY, OF PITTSBURGH, PENNSYLVANIA, A CORPORATION OF PENNSYLVANIA

METHOD OF AND APPARATUS FOR MACHINING VALVES, ETC.

Application filed June 19, 1925. Serial No. 38,172.

This invention is for a method of and apparatus for the machining of metallic articles such for example as castings for gate valves and the like. The invention is especially applicable to the manufacture of gate valves of wedge-gate type, but it is not confined to this particular type of work.

In the usual valve of the wedge-gate type, the valve seats are inclined in opposite directions at an angle to a plane perpendicular to the longitudinal axis of the valve. This requires, therefor, that in the making and in the repairing of these valves that the valve casting be set in one position to turn the square surfaces thereof and in other positions to successively machine the oppositely inclined valve seats.

The practice as ordinarily followed at the present time is to mount the valve casting in a lathe and machine the square surfaces thereof. Then the casting has to be secured to a wedge block on the face plate of a lathe so as to properly present one of the valve seats for machining. Having machined one valve seat, it has been the practice to remove the valve from its wedge plate, reverse it end for end, and again properly mount the valve on the wedge plate for the machining of the other valve seat. This work of setting up the valve on a wedge plate is very exacting and requires absolute accuracy of measurement. It is not only exacting and time consuming, but with large heavy valves, it requires considerable manual labor.

In my co-pending application Serial No. 38,173 filed June 19, 1925, to which the present application is related, I have shown and described an apparatus wherein the casting, after having its square ends machined, can be conveniently mounted so as to bring one seat of the valve in position to be machined, and after such seat has been machined, slight adjustments may be made in the apparatus without disturbing the valve, to present the other seat in the proper plane.

According to the present invention I provide an apparatus in which the casting can be quickly secured, after which all the surfaces, both square and inclined may be finished without once removing the valve, such apparatus being readily adjustable to present the surfaces to be machined in the proper plane and position. The invention further pertains to a novel method for machining valves.

The nature of the invention may be readily understood by reference to the accompanying drawings, wherein:

Figure 1 is a side elevation of the apparatus showing the outline of a valve therein in broken lines, the valve being in position for the machining of the T-face thereof.

Figure 2 is a plan view of the arrangement shown in Fig. 1, part of the apparatus being broken away.

Figure 3 is a front end view of the apparatus, the valve being omitted.

Figure 4 is a transverse section on the plane of line IV—IV of Fig. 2, showing a front elevation of the face plate.

Figures 5 and 6 are views similar to a part of Fig. 2 but showing the valve turned to the two positions necessary for machining the two valve faces.

Figure 7 is a detail view of a locking pin, and a key therefor.

In the drawings 5 designates the end of a lathe shaft or the shaft of any other suitable machine, and 6 is a face plate carried thereon. Secured to the face plate is the base 7 of a cradle, designated generally as 8, the cradle being retained in position by bolts 9 passing through slots 7$^a$ in the base of the cradle. Loosening of the bolts 9 permits the cradle to be shifted to either side of the axis of rotation of the lathe, for the purpose hereinafter described. This adjustment can be made by turning a screw 10 extending across the face plate and having bearings therein at 11. On this screw is a nut 12 disposed between saddle like projections 13 on the base of the cradle. This general arrangement can be best understood by reference to Figs. 2 and 4. When the screw 10 is rotated, by means of a suitable key or socket wrench, the nut 12 travels along the screw to shift the cradle laterally as may be desired.

Projecting forwardly from the base of the cradle are two arms 8$^a$ of necessary length. The ends of these arms have alined openings 8$^b$ therein in which are trunnions 14 of a valve holder or jig 15. This jig, as best shown in Fig. 1, is a U-shaped construction having a yoke 15ᵃ at each end into which a rough valve casting A may be set. This casting may be retained in place by removable clamping bars or strips 16 held in place by bolts 17. The axis of the trunnions for the jig must, in the arrangement shown, be at right angles to the axis of the screw 10.

In one of the arms 8ᵃ are two sockets 18 and 18¹ in which are locking pins of similar construction. This construction includes an interiorly threaded hard steel bushing 19. Fitted into this threaded bushing is a threaded plug 20 having a downward extension 21 thereon, this extension passing centrally through a hard steel pin 22 having a conical end 22¹. A nut 21¹ on the extension 21 serves to hold the pin 22 on the extension 21. The upper face of plug 20 has a recess 20ᵃ therein with which a removable key 23 may cooperate to raise the pin up and down by turning the plug. A shield 24 may be provided over the top of bushing 19.

In the valve receiving jig 15 on one of the faces thereof concentric to its trunnions, are a plurality of sockets arranged in two series, the sockets of one series being designated 25, 26 and 27 and those of the other series being 25', 26', and 27'. In order to minimize the wear of the parts and reduce liability of error through the wear of parts, each of the sockets is preferably provided with a hardened bushing 29 having a conical opening therein.

With this arrangement, the valve holding jig may be rotated on its trunnions and any of the holes 25, 26 or 27 be brought into register with the locking pin in socket 18, and any of the socket 25', 26', or 27' brought into register with the pin in socket 18. As these locking pins have tapered ends, they cooperate with the conical openings in the bushings to accurately center the locking pin in the bushing.

The operation may now be followed. A rough valve casting is fitted into the jig 15 and bars 16 bolted on to retain the casting in place. The jig is properly shaped and dimensioned for the size of valve with which it is to be used, and after the valve is clamped therein, it can have no relative movement in the jig. The symbol A designates the valve casting, which has the usual globe like body with flanged or other suitably shaped ends A¹. Through the valve is the usual passage, and A² designates the T on the valve body through which the gate operates. The outer face, A³, of this T is flanged. At a' and a'' are the valve seats to be machined.

After the valve is placed in the jig, the jig holding cradle 8 is set so that the cradle is centered on the face plate and rotates concentrically. The jig is then turned, it may be assumed, to the position shown in Figs. 1 and 2 and clamping pin at 18 entered into socket 25. Fig. 7 shows the locking pin projected into locking engagement. The jig is thus held against rotation in the cradle. Bolts 9 are tightened to hold the cradle securely on the face plate.

The lathe may now operate to revolve the face plate and the cradle. As thus set, a cutting tool at X may machine flange face A³. After face A³ has been completed, the locking pin at 18 may be retracted, and the jig rotated 90 degrees. After being so rotated, the locking pin at 18 registers with socket 27, and may be entered into this socket to lock the jig. One of the ends A¹ of the valve may be next machined. At this time the valve is in the position indicated in Fig. 5, where line c—c indicates the axis of rotation of the lathe and the center line of the valve. When the lathe is again operated with the valve so set, one of its end flanges A¹ may be machined. After this end has been machined, the jig may be rotated 180 degrees and locked by the pin at 18 to present the other flange A¹ to be machined.

In this way, all of the square surfaces of the valve may be machined. Next the valve seats a' and a'' must be finished. As these valve seats are inclined in opposite directions from a plane perpendicular to the longitudinal axis of the valve, it is obvious that some special adjustment must be provided to machine these surfaces.

To this end, the jig in which the valve is held is rotated through an arc sufficient to bring one of the valve seats, say a', as shown in Fig. 6, into a plane perpendicular to the axis of rotation of the lathe. This however, sets the longitudinal axis of the valve, c—c, at an angle to the axis of rotation of the lathe d—d (Fig. 6). Therefore the seat a¹ would rotate eccentrically about the axis of rotation of the lathe. To correct this, the bolts 9 are loosened, and the screw 10 is operated to shift the cradle laterally sufficiently to cause the longitudinal axis of the valve to intersect the axis of rotation of the lathe in the plane of the seat to be machined, this point of intersection being designated s, in Fig. 6. When this has been done, the various parts are locked and the pin at 18¹ is entered into a registering hole, say 26, to hold the jig at the proper angle. After having machined seat a', the jig is rotated to bring the other seat a'' perpendicular to the axis of rotation of the lathe. It is preferred that the jig be rotated to bring seat a'' to the position of seat a' in Fig. 6, so that a change of cutting tools is not necessary.

Obviously, however, the jig could be moved through only a small arc, in which case a front cutter would be used in machining one seat and a rear cutter used in machining the other. In either event, however, after seat $a''$ has been moved so that it is in a plane perpendicular to the axis of rotation of the lathe, it is eccentric to the longitudinal axis of the valve and the cradle is shifted by operation of the screw 10 to the other side of the center of the face plate until the axis of rotation and the longitudinal axis of the valve coincide in the plane of the seat $a''$. Upon locking the parts in position, seat $a''$ may be machined.

In this manner an entire valve casting can have all of the surfaces to be finished machined in one lathe, and with but one setting of the valve in the machine. It is not necessary or desirable to remove the valve after it is once set in the machine. All adjustments to present the different faces to the cutting tool can be quickly and conveniently made with absolute accuracy.

Calibrations on the movable and stationary parts may be arranged to facilitate the making of adjustments. Furthermore, after the valve is once set in the jig, it does not matter if it is not initially on an absolutely centered position, because, since it is not taken out of the machine until after all faces have been machined, these faces will all bear the same proper relative relation to one another.

Obviously the various surfaces do not have to be machined in the sequence described, as the order in which the different faces and surfaces are machined is not material. Various changes in the construction and arrangement of parts are also considered within the scope and spirit of my invention. Although I have described the invention as being particularly applicable to the machining of gate valves, it will be understood that it may apply in the machining of other articles than gate valves, and its principle may be utilized in connection with other machine tools than lathes.

I claim as my invention:

1. A machine for the machining of valves and the like, including a supporting member adapted for rotation, a unitary cradle member on the supporting member and adjustable transversely with respect thereto, and a valve holding jig movable unitarily with the cradle member and rotatably carried in the cradle with its axis of rotation at right angles to the transverse direction of adjustment for the cradle, and means for adjustably holding the jig in various positions to which it may be rotated.

2. A machine for the finishing of valves and the like, including a face plate adapted for rotation, a cradle carried by the face plate, means for moving the cradle transversely of the face plate, a valve holder rotatably carried in the cradle and movable unitarily with the cradle, its axis of rotation being transverse to the direction of adjustment for the cradle, the transverse movement of the cradle enabling the same valve to be located in a plurality of lateral positions with respect to the axis of rotation of said plate.

3. A machine of the class described for machining valves and the like, including a face plate adapted for rotation, a cradle carried on the face plate, a screw for effecting the transverse movement of the cradle on the face plate, a jig rotatably carried in the cradle and movable unitarily with the cradle with its axis of rotation perpendicular to said adjusting screw, the transverse movement of the cradle enabling the same valve to be located in a plurality of lateral positions with respect to the axis of rotation of said plate, and means for adjustably holding the jig against relative rotation in the cradle.

4. A machine for finishing valves having end faces, a T-face, and valve seats inclined with respect to the end faces in opposite directions, including a face plate adapted for rotation, a cradle adjustable transversely to the face plate, a jig pivotally carried in the cradle with its axis transverse to the direction in which the cradle may be adjusted and means for holding the jig against rotation for the machining of the end faces of a valve, the T-face of a valve, and the two seats of a valve, and means for adjusting the cradle laterally of the face plate when one or the other of the valve seats is being held in position to be machined, whereby the same valve may be located in a plurality of lateral positions with respect to the axis of rotation of said plate.

5. A machine for finishing valves having oppositely inclined seat faces, including a revoluble face plate, and a valve holder thereon adjustable to different angles with respect to the axis of rotation of the face plate whereby one or the other of the seats may be in a plane perpendicular to the axis of rotation of the face plate, said holder being also movable transversely of the face plate to cause the longitudinal axis of the valve to intersect the axis of rotation of the face plate in the plane of that valve seat which is perpendicular to the said axis of rotation.

6. The method of finishing and machining the square faces and valve seats of gate valve castings where the seats are oppositely inclined from a plane perpendicular to the axis of the valve, which includes mounting the valve in a rotatable and laterally adjustable holder of a machine, centering the holder with respect to the axis of the machine, rotating the holder to successively position each square face at right angles to the axis of the machine and successively finishing each face so presented, then rotating the holder to position one of the valve seats in a plane perpendicular to the axis of the machine, adjusting the holder to one side of the axis of the machine until the longitudinal axis of the valve intersects the axis of the machine in the plane of the seat so positioned, machining the seat, then correspondingly adjusting the holder of the machine to correspondingly position the other seat, and then machining said second seat.

In testimony whereof I affix my signature.

ROBERT W. BISSELL.